US010485643B2

(12) United States Patent
Hart et al.

(10) Patent No.: US 10,485,643 B2
(45) Date of Patent: Nov. 26, 2019

(54) ANIMAL CONTROL SYSTEM

(71) Applicant: Wildlife Protection Management, Inc., Albuquerque, NM (US)

(72) Inventors: Roch Hart, Albuquerque, NM (US); Jaime Pulido, Albuquerque, NM (US); Jonathan Michael West, Albuquerque, NM (US)

(73) Assignee: Wildlife Protection Management, Inc., Albuquerque, NM (US)

( * ) Notice: Subject to any disclaimer, the term of this patent is extended or adjusted under 35 U.S.C. 154(b) by 0 days.

(21) Appl. No.: 16/004,016

(22) Filed: Jun. 8, 2018

(65) Prior Publication Data

US 2018/0353276 A1    Dec. 13, 2018

Related U.S. Application Data

(60) Provisional application No. 62/516,945, filed on Jun. 8, 2017.

(51) Int. Cl.
*A61D 7/00* (2006.01)
*A01K 11/00* (2006.01)
*A01K 5/01* (2006.01)

(52) U.S. Cl.
CPC ............... *A61D 7/00* (2013.01); *A01K 5/01* (2013.01); *A01K 11/006* (2013.01)

(58) Field of Classification Search
CPC ........... A01K 11/006; A01K 5/01; A61D 7/00
See application file for complete search history.

(56) References Cited

U.S. PATENT DOCUMENTS

| 4,684,366 | A | 8/1987 | Denny et al. |
| 8,495,972 | B1 * | 7/2013 | Pound ............... A61D 7/00 |
| | | | 119/174 |
| 9,814,228 | B2 * | 11/2017 | Pinkston ............ A01M 23/20 |
| 10,024,623 | B2 * | 7/2018 | Elkins ................ F41B 11/57 |
| 2010/0010006 | A1 | 1/2010 | Lance et al. |
| 2011/0209764 | A1 * | 9/2011 | Uber .................. A61M 5/007 |
| | | | 137/1 |
| 2012/0069189 | A1 * | 3/2012 | Elkins ................ F41B 11/57 |
| | | | 348/158 |
| 2013/0054018 | A1 * | 2/2013 | Holman ............... G06F 17/00 |
| | | | 700/244 |

(Continued)

FOREIGN PATENT DOCUMENTS

| CN | 204909712 | 12/2015 |
| WO | 2017020084 A1 | 2/2017 |
| WO | 2017083674 A1 | 5/2017 |

*Primary Examiner* — Reza Aghevli
(74) *Attorney, Agent, or Firm* — Peacock Law P.C.; Steve M. McLary; Philip D. Askenazy

(57) ABSTRACT

An animal injection system under the control of a remote operator. The system may be used to inject animals with medications and/or RFID chips. Food bait is provided in such a manner as to require an animal to expose its chest and underside. Cameras are used to determine the orientation of the animal and its gender. Images of the animal are sent to the remote operator who determines whether or not to inject an animal. Cellphone networks may be used to transmit animal images to the remote operator and send commands from the operator to the injection system. The system may include a temperature control system to maintain medications in a pre-selected temperature range.

20 Claims, 2 Drawing Sheets

(56) References Cited

U.S. PATENT DOCUMENTS

| | | | |
|---|---|---|---|
| 2013/0054019 A1* | 2/2013 | Holman | G07F 17/0064 700/244 |
| 2013/0054020 A1* | 2/2013 | Holman | G07F 13/065 700/244 |
| 2013/0054257 A1* | 2/2013 | Holman | G07F 17/0064 705/2 |
| 2013/0220160 A1 | 8/2013 | Van Burdine et al. | |
| 2014/0140582 A1 | 5/2014 | Spicola | |
| 2014/0336862 A1 | 11/2014 | Womble | |
| 2015/0068466 A1 | 3/2015 | Piccioni | |
| 2015/0100037 A1 | 4/2015 | Allsup | |
| 2016/0026895 A1 | 1/2016 | Huffman et al. | |
| 2016/0081782 A1 | 3/2016 | Weyer | |
| 2016/0125276 A1* | 5/2016 | Spicola, Sr. | A01K 11/008 382/110 |
| 2016/0192638 A1 | 7/2016 | Pinkston | |
| 2017/0006826 A1 | 1/2017 | Torres | |
| 2017/0079260 A1 | 3/2017 | Hays | |

* cited by examiner

ANIMAL CONTROL SYSTEM

CROSS-REFERENCE TO RELATED APPLICATIONS

This application claims priority to and the benefit of the filing of U.S. Provisional Patent Application Ser. No. 62/516,945, entitled "ANIMAL CONTROL SYSTEM", filed on Jun. 8, 2017, and the specification and claims thereof are incorporated herein by reference.

BACKGROUND OF THE INVENTION

Field of the Invention (Technical Field)

The present invention relates to systems to assist in the control and vaccination of animals, more particularly to an apparatus and method to administer medication to wild or domestic animals, for example, wild horses or cattle, and, if needed, at the same time inject a radio frequency identification (RFID) chip in the animal at the time of administration of the needed vaccine. In one example, the numbers of wild horses have caused significant damage to rangelands and to themselves. Efforts to catch or chase and apply birth control or needed vaccines for disease to wild horses, including wild mares, by injection are very labor intensive and to date have not been cost effective or comprehensive. The present invention will allow the injection of birth control agents into mares and other vaccines into all wild horses on a controlled and routine basis.

Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed. Existing systems for the injection of animals do not take into consideration the gender of the animal and the orientation of the animal at the time of injection. The present invention provides an animal injection system under operator control, taking into account animal orientation with respect to the injection system and the gender of the animal.

BRIEF SUMMARY OF THE INVENTION

The present invention is an animal injection apparatus comprising an animal bait bay, an injection system disposed adjacent to the bait bay, a first camera positioned to enable a remote operator to detect when an animal has exposed its chest to the injection system; a second camera positioned to enable the remote operator to determine the gender of the animal, and a transmitter to send images from the cameras to the remote operator. The injection system may include at least one dart barrel containing an injection syringe dart and a control system to allow the remote operator to fire the dart barrel, thereby injecting the animal with the injection syringe dart. The dart barrel may be gas powered. The dart barrel may contain an injection syringe containing an animal medication. The medication may be a birth control agent or may be a disease control agent. The dart barrel may contain an injection syringe containing an RFID chip. The apparatus may also include a temperature control system for maintaining the medication within a pre-selected range. The temperature control system may be a Peltier Effect system or one or more gel packs. The control system of the apparatus may include a cellphone modem and a gateway router for sending images and the sending and receiving of data and commands. The bait bay is preferably configured so that an animal accessing the bait bay must expose its chest to the first camera and its underside to the second camera. The apparatus may further include a second injection station disposed adjacent to the bait bay, a third camera positioned to enable the remote operator to determine when a second animal has exposed its chest to the second injection system, and a fourth camera positioned to allow the remote operator to determine the gender of the second animal.

The present invention is also a method for injecting animals comprising providing a bait station to attract an animal, transmitting one or more first images showing the presence of an animal at the bait station and one or more second images showing the underside of an animal to a remote operator, and injecting the animal based on a command by the operator. The step of injecting an animal preferably comprises firing a medication containing syringe dart from a dart barrel. The step of injecting an animal may also include firing a syringe dart containing an RFID chip from a dart barrel. The method may also comprise the step of maintaining the temperature of the injection station within a pre-determined range. The method may also include positioning a first camera to capture one or more first images and positioning a second camera to capture the one or more second images. The transmitting step may include connecting the first and second cameras to a cellphone modem and gateway router system and sending the first and second images from the cameras by cellphone transmission to the operator. The method preferably enables the operator to use the one or more second images to determine the gender of the animal.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, explain the principles of the invention. The drawings are only for illustrating one or more embodiments of the invention and are not to be construed as limiting the invention. In the drawings.

DETAILED DESCRIPTION OF THE INVENTION

At least one embodiment of the present invention is an animal injection system that preferably includes an animal bait station, an injection station preferably disposed adjacent to the bait station, at least one chest camera, at least one gender camera, each preferably adjacent to the bait station, and a transmitter to send images from the cameras to a remote operator. The injection station may include at least one gas powered dart barrel for firing an injection syringe and a control system to allow the remote operator to fire the dart barrel and thus inject an animal at the bait station. The control system of this embodiment may include a cellphone modem and a gateway router to allow the sending of images and the sending and receiving of data and commands. The bait station is preferably configured such that an animal accessing the bait station exposes its underside to the cameras and the injection system. The injection system may include multiple dart barrels which can be fired by the operator as chosen. Each syringe dart may preferably include either a medication or an RFID chip. The medication may comprise a birth control agent or a disease control agent. If required, the injection system may also include a temperature control system for maintaining the medication in a pre-selected temperature range. The injection system may further include a plurality of injection stations arrayed around the bait station, each injection station preferably including chest and gender cameras and each station being independently controllable by the remote operator.

Figure 1:
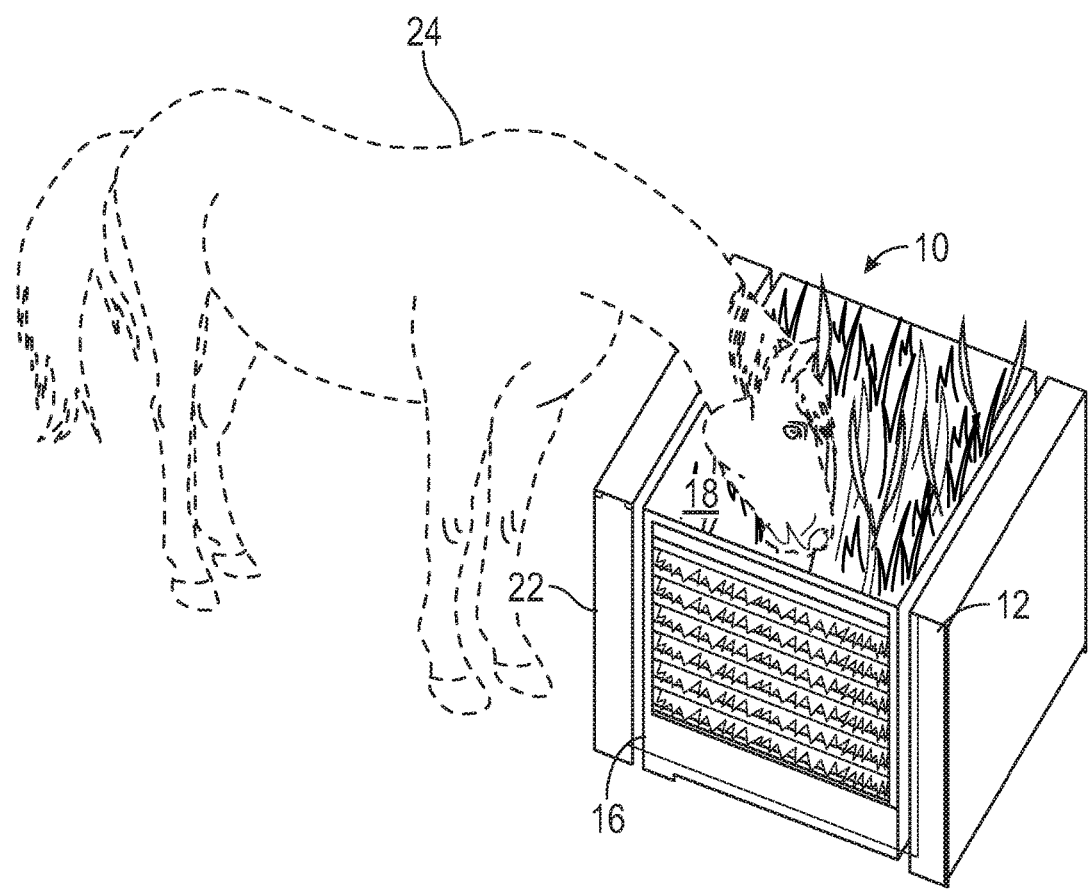
FIG. 1 is a perspective view illustrating an injection system in accordance with an embodiment of the present invention.
Figure 2:
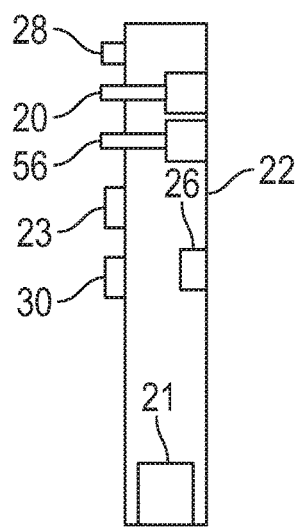
FIG. 2 is schematic, cut away side view of the dart bay of the system of FIG. 1.

In an embodiment of the present invention, FIG. 1 illustrates an injection administration system 10. Injection administration system 10 is a remotely controlled system to inject RFID tags or chips and administer vaccines, birth control, tranquilizers, or euthanasia medications to large to medium sized animals, particularly wild animals such as horses, deer, elk, coyote, swine, and burros. Injection administration system 10 may also be used with domestic animals such as sheep, cattle, or goats, for example. Injection administration system 10 fires a syringe dart containing a medication into the animal to treat diseases and administer birth control agents such as PZP or Gonacon. Diseases to be treated may include, but not limited to, West Nile, chronic wasting disease, or any animal disease needing a syringe dart type of injection. The syringe dart can also contain a tranquilizer or, if appropriate, a euthanasia agent. The injection dart or syringe dart may be of the commercially available type made by, for example, Pnu-Dart Corporation. This company makes a variety of animal injection darts to serve different purposes and to suit different animals. In the present invention, a government agency, such as the USDA, may dictate which type of dart will need to be used for different animals. However, it is anticipated that a commercially available syringe dart will be used in most cases, although a custom designed dart could be used if required. Injection administration system 10 includes weather resistant equipment bay 12 which preferably encloses operating components 14. System 10 further includes bait bay 16 designed to hold a food bait 18, bait bay 16 and food bait 18 making up a bait station. Food bait 18 will vary depending on the species of animal to be attracted. In the embodiment shown, hay is provided as bait 18 to attract horses. One or more dart barrels 20 are positioned in front of bait bay 16 in weather resistant dart bay 22 and are controlled through operating components 14 (see FIGS. 2 and 3), which may be housed in dart bay 22. Note that food bay 16 is positioned such that an animal, such as horse 24, must lean forward to access the bait 18. This exposes the chest/shoulders of animal 24 to dart barrels 20 for injection of medication and/or RFID chips. The positioning and location of bait bay 16 in medication administration system 10 can be adjusted for different species of animals such that an animal reaching for bait 18 will expose its chest to dart barrel 20 for delivery of the appropriate medication FIG. 2 shows in schematic form a cutaway side view of dart bay 22. Dart bay 22 preferably comprises a dart barrel 20 carrying an injection syringe dart containing medication, with a portion being exposed to deliver the dart to animal 24. Dart bay 22 also preferably comprises dart barrel 56 carrying an injection syringe dart containing an RFID chip, with a portion being exposed to deliver the dart to animal 24. Chest camera 28 and gender camera 30 are preferably affixed to the exterior of dart bay 22. These cameras can be located in other positions within injection administration system 10 so long as their function can be fulfilled. Chest camera 28 is mounted to see when an animal 24 has exposed its chest to dart barrel 20. Gender camera 30 is mounted to view the underside of animal 24 to allow determination of its gender. A human operator at remote operating station 31 (see FIG. 3) can view these camera images and determine if a particular animal 24 should be darted. Peltier Effect heating/cooling system 21 may be placed in dart bay 22 to serve as a temperature control system. Peltier Effect system 21 may include a battery for power. In some cases, battery power could be furnished from the battery associated with operating components 14. This system is provided because most vaccines require a holding temperature range of thirty-four to forty-five degrees F. In some cases other devices, for example pre-frozen gel packs, could act as a temperature control system. In some cases, weather conditions would require heating of vaccines to prevent freezing. In this case, battery powered heat cables with thermostats could be incorporated in dart bay 22 to prevent freezing of the medication if a Peltier Effect heating/cooling system 21 was not used. RFID chip reader 23 may be attached to the exterior of bay 22 to read previously injected chips in animals. RFID chip reader 23 may be located elsewhere within system 10 so long as it can read an injected RFID chip. Temperature sensor 26 monitors and reports the temperature within dart bay 22.

Figure 3:
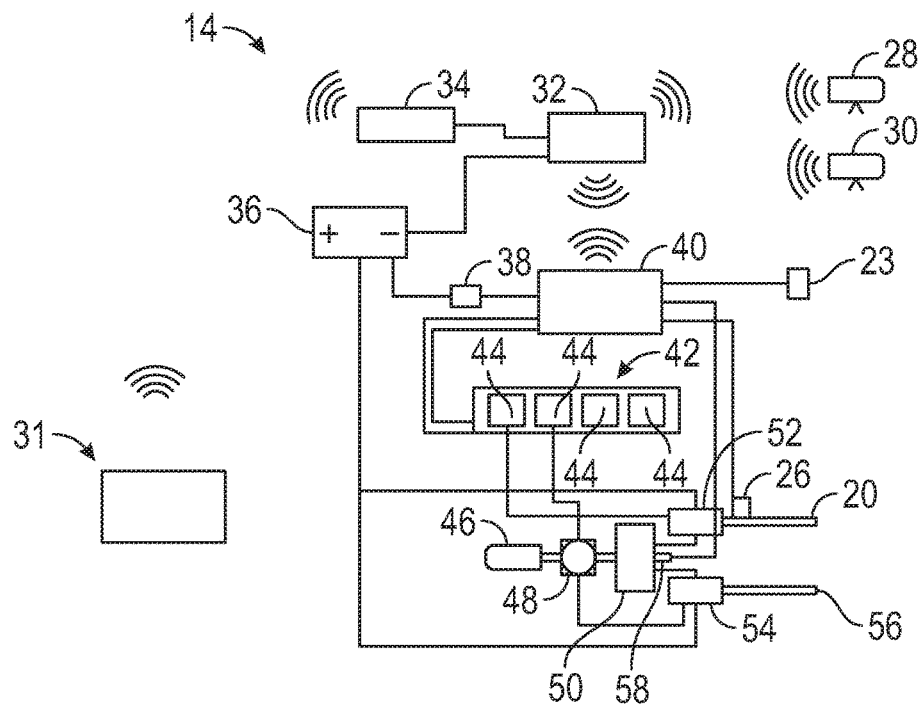
FIG. 3 is a schematic diagram of the operational components of the system of FIG. 1 and a remote-control station.

FIG. 3 shows operating components 14 in a schematic form and also includes in schematic form remote operating station 31. In operation, it is expected that a number of injection administration systems 10 would be positioned across an area of many hundreds of square kilometers. It is understood that circumstances could require positioning such systems 10 in a denser array or in any arrangement, but the remote control function to be described allows placement of these systems 10 over a wide area. Chest camera 28 and gender camera 30 are preferably controlled through components 14. FIG. 3 illustrates that injection administration system 10 is preferably designed to operate with a cell phone 3g/4g network. Cellphone modem 32 receives cellphone data signals and with gateway router 34, acts as an internal WIFI data distribution center for injection administration system 10. Using this technique allows for minimal hard wiring and resulting flexibility in positioning components in the field. In the event cell phone service is not available, a long range microwave transmission system with a range of about 20 km may be used. Other two way communication systems could also be used, such as satellite based communications. In the field, components 14 are powered by battery 36. Power supply 38 converts battery 36 voltage to the voltage needed by the system. Microcontroller board 40, which is preferably a programmable logic controller with input/output modules, has WIFI capacity to receive and execute remote commands from router 34, that can, for example, actuate dart barrel 20, monitor dart barrel 20 temperature, control system gas pressure, read RFID chip information, and monitor an animal proximity reader. Relay board 42 carries a number of relays 44 controlled by microcontroller board 40. Injection power for darts is provided by gas supply canister 46 which may be a 16 gram bottle used by paintball guns. Other ways to fire dart barrels could be used, for example, and not by way of limitation, spring loaded mechanisms or electronic mechanisms. Gas canister 46 supplies gas through pressure regulator 48. Manifold 50 distributes gas to dart barrel 20 and RFID dart barrel 56. Dart barrel 20, which will carry a dart syringe containing medication, is controlled by solenoid valve 52 through microcontroller board 40, and dart barrel 56, which will carry an RFID chip in an injection syringe dart for injection into animal 24, is controlled by solenoid valve 54 through microcontroller board 40. It should be noted that while two dart barrels 20 and 56 are shown, injection administration system 10 in field use will preferably comprise multiple such dart barrels positioned in dart bay 22 so that the station 10 could be in use for some period of time without requiring servicing. Temperature sensor 26 monitors and reports the temperature in dart bay 22 and pressure sensor 58 monitors and reports the pressure available in the system for firing darts from dart barrels such as dart barrels 20 and 56.

Figure 4:
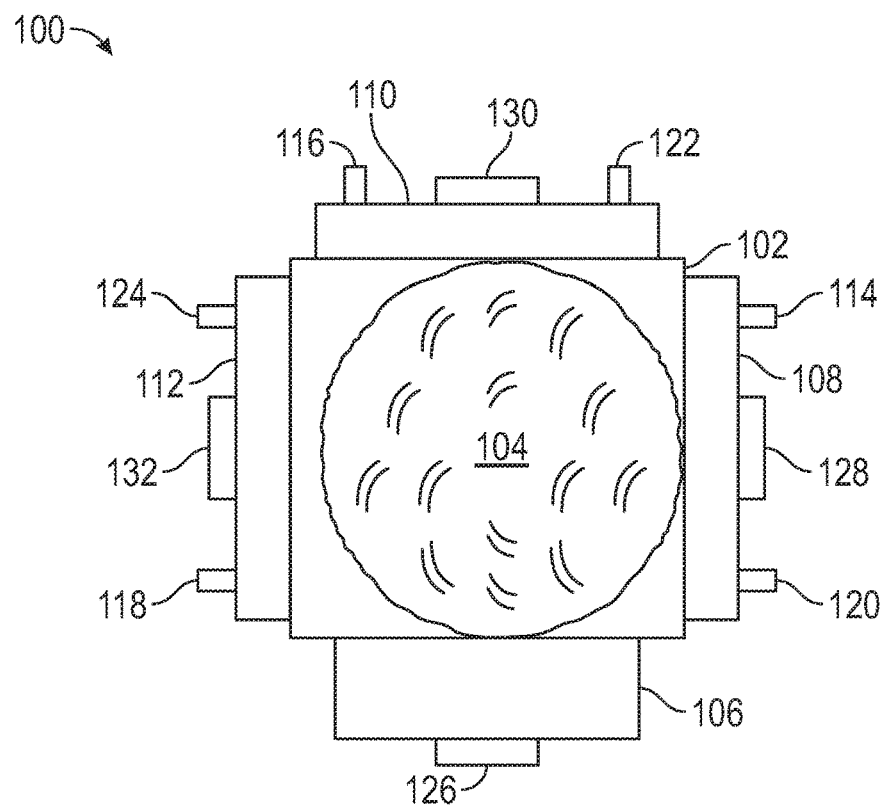
FIG. 4 is a top, schematic view of another embodiment of an injection system in accordance with the present invention

FIG. 4 illustrates an embodiment of a multiple injection administration station 100 that provides three possible locations for firing darts into animals, for example horses. While single station systems as previously discussed are operationally sound, in some cases, it may be useful to have medication administration stations with multiple locations to fire darts. Station 100 preferably has a single bait bay 102 containing bait 104, again the two defining a bait station. Station 100 also preferably comprises a single equipment bay 106 containing the operating components as previously described. Station 100 as shown comprises three dart bays 108, 110, 112. These house dart barrels 114, 116, 118, respectively, for administration of medication and vaccines. As previously discussed, there can be multiple stacked barrels at each location. Dart bays 108, 110, 112 also can comprise RFID dart barrels 120, 122, 124 for firing RFID chips when required. RFID barrels 120, 122, 124 may also have multiple stacked barrels at each location. At least one wide angle camera 126, preferably mounted on equipment bay 106 is positioned to view the chest area of an animal at any of the three locations spaced around bait bay 102. Alternatively, multiple cameras arranged around the bait bay may be used. Individual low level gender cameras 128, 130, and 132 are preferably attached to the lower portion of dart bays 108, 110, 112, respectively, to determine the gender of an animal at any one of those bays. The operation of each of the three positions around bait bay 102 is substantially identical to that of the single unit previously described. Each of the three positions may be operated independently, or all three may be operated substantially simultaneously, if required. A central data base can be maintained to contain RFID data, gender, vaccine or medication administered, animal description, timestamp, and video/image information which an operator can access before making a decision to fire any dart. This data base may be cloud based or stored locally.

In operation, numerous injection administration stations would be positioned across a wide area. A human operator at remote operating station 31 would be made aware of the approach of an animal 24. The human operator would view the output from one or more gender cameras to determine the gender of the animal. In the case of wild horses, where PZP birth control is a goal, the operator could then fire a birth control dart into a horse, once it was determined the horse was a mare and one or more cameras showed the horse in position to receive a dart. If the same horse returned at a later date and an RFID chip had been injected in the horse, the human operator could read the RFID chip and refrain from further medication injection until a prescribed time. The RFID system can automatically report RFID chipped animals to a central data base for continued monitoring of location and appearance.

Note that in the specification and claims "about" or "approximately" means within twenty percent (20%) of the numerical amount cited. As used herein, the singular forms "a", "an", and "the" includes plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the described embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An animal injection apparatus comprising:
   an animal bait bay;
   an injection system, including a fixed dart injection bay, disposed adjacent to the bait bay;
   a first camera positioned to enable a remote operator to detect when an animal has exposed its chest to said injection system;
   a second camera positioned to enable the remote operator to determine the gender of the animal; and
   a transmitter to send images from the cameras to the remote operator.

2. The apparatus of claim 1 wherein the injection system comprises:
   at least one fixed dart barrel containing an injection syringe dart; and
   a control system to allow the remote operator to fire the dart barrel, thereby injecting the animal with the injection syringe dart.

3. The apparatus of claim 2 wherein the at least one dart barrel is gas powered.

4. The apparatus of claim 2 wherein the injection syringe dart contains an animal medication.

5. The apparatus of claim 4 wherein the medication is a birth control agent.

6. The apparatus of claim 4 wherein the medication is a disease control agent.

7. The apparatus of claim 4 further comprising a temperature control system for maintaining the medication within a predetermined temperature range.

8. The apparatus of claim 7 wherein the temperature control system comprises a Peltier Effect system or one or more gel packs.

9. The apparatus of claim 2 wherein the injection syringe dart contains an RFID chip.

10. The apparatus of claim 2 wherein the control system comprises a cellphone or satellite modem and a gateway router for sending images to the operator and the sending and receiving of data and commands.

11. The apparatus of claim 1 wherein the bait bay is configured so that an animal accessing said bait bay exposes its chest to said first camera and said injection system and its underside to said second camera.

12. The apparatus of claim 1 further comprising:
a second injection system, including a fixed dart injection bay, disposed adjacent to the bait bay;
a third camera positioned to enable the remote operator to determine when a second animal has exposed its chest to said second injection system;
a fourth camera positioned to enable the remote operator to determine the gender of the second animal.

13. A method for injecting animals, the method comprising:
providing a bait station to attract an animal;
providing an injection station, including a fixed dart injection bay, adjacent to the bait station;
transmitting one or more first images showing the presence of an animal at the bait station and one or more second images showing the underside of the animal to a remote operator; and
injecting the animal based on a command by the operator.

14. The method of claim 13 wherein the step of injecting the animal comprises firing a medication containing syringe dart from a dart barrel.

15. The method of claim 14 further comprising the step of maintaining the temperature of the injection station within a pre-determined range.

16. The method of claim 13 wherein the step of injecting the animal comprises firing a syringe dart containing an RFID chip from a dart barrel.

17. The method of claim 13 further comprising positioning a first camera to capture the one or more first images and positioning a second camera to capture the one or more second images.

18. The method of claim 13 wherein the transmitting step comprises:
connecting said the first and second cameras to a cellphone or satellite modem and gateway router system; and
sending the first and second images from the cameras by cellphone or satellite transmission to the operator.

19. The method of claim 13 wherein the one or more second images enable the remote operator to determine a gender of the animal.

20. The method of claim 16 further including the step of reading an RFID chip previously injected into an animal and transmitting the read information to the operator.

* * * * *